(12) United States Patent
Person

(10) Patent No.: US 9,728,300 B2
(45) Date of Patent: Aug. 8, 2017

(54) POWER CABLE WITH A THICK INSULATION LAYER AND A METHOD FOR ITS MANUFACTURE

(71) Applicant: Dow Global Technologies LLC, Midland, MI (US)

(72) Inventor: Timothy J. Person, Freehold, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/770,322

(22) PCT Filed: Feb. 25, 2014

(86) PCT No.: PCT/US2014/018317
§ 371 (c)(1),
(2) Date: Aug. 25, 2015

(87) PCT Pub. No.: WO2014/158570
PCT Pub. Date: Oct. 2, 2014

(65) Prior Publication Data
US 2016/0012940 A1    Jan. 14, 2016

Related U.S. Application Data

(60) Provisional application No. 61/777,021, filed on Mar. 12, 2013.

(51) Int. Cl.
*H01B 7/02* (2006.01)
*H01B 13/14* (2006.01)
(Continued)

(52) U.S. Cl.
CPC .......... *H01B 7/0216* (2013.01); *B29C 47/027* (2013.01); *B29C 47/06* (2013.01);
(Continued)

(58) Field of Classification Search
CPC .......... B29L 2031/3462; H01B 7/0208; H01B 7/0216; H01B 7/0225; H01B 7/0275; H01B 9/027; H01B 13/14; H01B 13/141; B29C 47/025; B29C 47/027; B29C 47/06; B29C 47/065
USPC .......................................................... 156/51
See application file for complete search history.

(56) References Cited

U.S. PATENT DOCUMENTS 3,580,987 A    5/1971  Priaroggia
4,457,975 A    7/1984  Bahder
(Continued)

FOREIGN PATENT DOCUMENTS

| CA | 1178673 A | 11/1984 |
| CN | 1571075 A | 1/2005 |
| WO | 2005/015576 A1 | 2/2005 |

OTHER PUBLICATIONS

Lawrence J. Kelly et al., "Cable Manufacturing" in "Electrical Power Cable Engineering, Second Edition", Jan. 1, 1999, Chapter 10.

*Primary Examiner* — Carson Gross
(74) *Attorney, Agent, or Firm* — Husch Blackwell LLP

(57) ABSTRACT

A power cable comprising a: (A) Conductor; (B) First semiconductor in contact with the conductor; (C) First insulation layer in contact with the first semiconductor; (D) Second semiconductor layer in contact with the first insulation layer; (E) Third semiconductor layer in contact with the second semiconductor layer; (F) Second insulation layer in contact with the third semiconductor layer; and (G) Fourth semiconductor layer in contact with the second insulation layer.

4 Claims, 2 Drawing Sheets

(51) Int. Cl.
  *H01B 3/00* (2006.01)
  *H01B 9/02* (2006.01)
  *B29C 47/02* (2006.01)
  *B29C 47/06* (2006.01)
  *B29L 31/34* (2006.01)

(52) U.S. Cl.
  CPC ............ *H01B 3/004* (2013.01); *H01B 9/027* (2013.01); *H01B 13/141* (2013.01); *B29L 2031/3462* (2013.01)

(56) References Cited

U.S. PATENT DOCUMENTS

| | | |
|---|---|---|
| 4,857,600 A | 8/1989 | Gross et al. |
| 5,246,783 A | 9/1993 | Spenadel et al. |
| 5,272,236 A | 12/1993 | Lai et al. |
| 5,278,272 A | 1/1994 | Lai et al. |
| 5,575,965 A | 11/1996 | Caronia et al. |
| 5,986,028 A | 11/1999 | Lai et al. |
| 6,496,629 B2 | 12/2002 | Ma et al. |
| 6,714,707 B2 | 3/2004 | Rossi et al. |
| 8,045,833 B2 | 10/2011 | Wasserman et al. |
| 2003/0160676 A1 | 8/2003 | Valdemarsson |
| 2004/0020681 A1* | 2/2004 | Hjortstam ............... B82Y 30/00 174/102 SC |
| 2004/0091631 A1* | 5/2004 | Belli ....................... H01B 3/20 427/430.1 |
| 2008/0128939 A1* | 6/2008 | Dell' Anna .......... B29C 47/0016 264/104 |
| 2010/0027948 A1 | 2/2010 | Wasserman et al. |
| 2012/0181059 A1 | 7/2012 | Radermacher et al. |

* cited by examiner

POWER CABLE WITH A THICK INSULATION LAYER AND A METHOD FOR ITS MANUFACTURE

FIELD OF THE INVENTION

This invention relates to power cables. In one aspect the invention relates to power cables comprising a thick insulation layer while in another aspect, the invention relates to a method of manufacturing a power cable with a thick insulation layer.

BACKGROUND OF THE INVENTION

Extruded high-voltage cables utilized thick layers of insulation to ensure reliable service life. Such cable designs lead to challenges in cable manufacturing including the following: i) sufficiently long vulcanization processes to ensure adequate crosslinking of the inner layers of the insulation, ii) sufficient cooling process to cool the cable to enable reeling, iii) controlled cooling to minimize longitudinal stresses leading to "shrink-back" of the conductor from the insulating layers, iv) difficulty in cable centering in some manufacturing configurations in which heavy-wall cable designs are subjected to gravitational forces that lead to sag of the molten insulation around the conductor, v) long degassing times required to remove crosslinking byproducts via a diffusion process through thick layers of insulation, and vi) limited availability of cable lines suitable for high-voltage cable manufacturing.

The state-of-the-art cable manufacturing process involves a true-triple extrusion of an insulation layer between two semiconductor (shielding) layers in a concentric fashion around the conductor. This process provides smooth interfaces between the insulation and the surrounding materials and avoids the introduction of contamination in a multiple-step process. However, for thick insulation layers thermally induced crosslinking and subsequent evacuation or degassing of crosslinking byproducts leads to low productivity.

Although the potential for extruding the insulation layer in multiple steps is known, no reference suggests a multiple extruded insulation layer that is separated by an intermediate layer of high conductivity and/or permittivity. The multiplicity of layers in the absence of such an intermediate layer leaves open the potential for introduction of contamination or voids between the mating insulation layers, which would negatively impact cable reliability. Moreover, since extruding the insulation layer in multiple steps would require the steps to be performed in relatively rapid succession so that the second semiconductor layer can be applied to allow collection and storage of the cable, the advantage of reduced crosslinking and degassing times due to the curing of thinner layers is lost since the insulation layer is just as thick as if it had been extruded in a single step. Still further, use of multiple extrusion layers in a single pass process would require existing manufacturing processes to install an additional extruder in an attempt to achieve the quality that is currently achieved in the state-of-the-art true-triple process.

SUMMARY OF THE INVENTION

In one embodiment the invention is a method of manufacturing a power cable comprising a conductor, semiconductor layers and insulation layers, the process comprising the steps of:

(A) Extruding about the conductor a first insulation layer positioned between first and second semiconductor layers to make an inner power cable comprising:
(1) The conductor which is in contact with,
(2) A first semiconductor layer which is also in contact with,
(3) A first insulation layer which is also in contact with,
(4) A second semiconductor layer, and (B) Extruding about the inner power cable a second insulation layer positioned between third and fourth semiconductor layers to make the power cable comprising the inner power cable of which the second semiconductor layer is in contact with:
(5) The third semiconductor layer which is also in contact with,
(6) The second insulation layer which is also in contact with,
(7) The fourth semiconductor layer.

In one embodiment the invention is a power cable comprising a:

(A) Conductor having an exterior facial surface,
(B) First semiconductor layer having first and second facial surfaces, the first facial surface of the first semiconductor layer in contact with the exterior facial surface of the conductor;
(C) First insulation layer having first and second facial surfaces, the first facial surface of the first insulation layer in contact with the second facial surface of the first semiconductor;
(D) Second semiconductor layer having first and second facial surfaces, the first facial surface of the second semiconductor layer in contact with the second facial surface of the first insulation layer;
(E) Third semiconductor layer having first and second facial surfaces, the first facial surface of the third semiconductor layer in contact with the second facial surface of the second semiconductor layer;
(F) Second insulation layer having first and second facial surfaces, the first facial surface of the second insulation layer in contact with the second facial surface of the third semiconductor layer; and
(G) Fourth semiconductor layer having first and second facial surfaces, the first facial surface of the fourth semiconductor layer in contact with the second facial surface of the second insulation layer.

In one embodiment both the first and second passes are triple extrusions. The method of this invention allows for both passes to be conducted with the same equipment, and maintains good quality interfaces. The intermediate (second and third) semiconductor layers provide a barrier of high conductivity or permittivity, and they encapsulate any potential contamination in a manner in which stress concentration can be avoided. In other words, any contamination that may accumulate on the second semiconductive layer is trapped between the second and third semiconductive layers when the third semiconductive layer is applied to the second semiconductive layer.

DETAILED DESCRIPTION OF THE PREFERRED EMBODIMENT

Definitions

Figure 1:
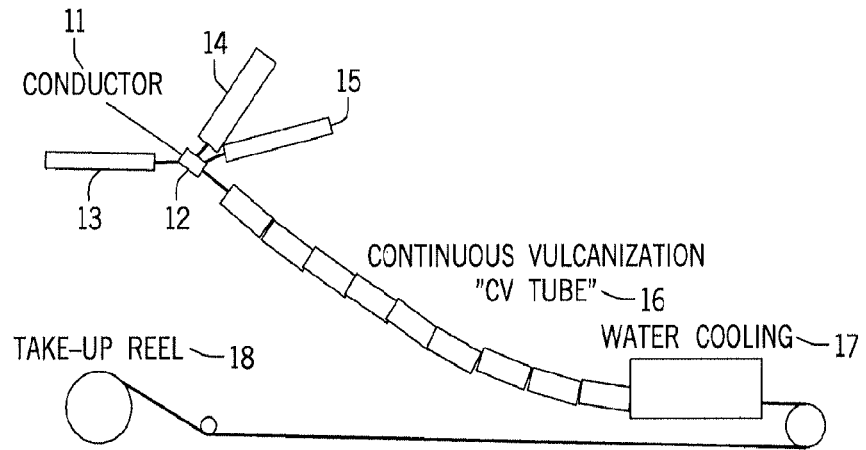
FIG. 1 is a schematic illustration of one embodiment of the process for making an inner power cable of this invention.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the thickness of the various power cable layers.

"Comprising", "including", "having" and like terms mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc. excepting those that are not essential to the performance, operability or the like of the composition, process, etc. The term "consisting of" excludes from a composition, process, etc., any component, step, etc. not specifically disclosed. The term "or", unless stated otherwise, refers to the disclosed members individually as well as in any combination.

"Cable", "power cable" and like terms means at least one conductive wire or optical fiber within a protective jacket or sheath. Typically a cable is two or more wires or optical fibers bound together, typically in a common protective jacket or sheath. The individual wires or fibers may be bare or covered. The protective jacket or sheath can comprise one or more semiconductor layers, and/or insulation layers, and/or metallic tapes, and/or exterior coatings. Combination cables may contain both electrical wires and optical fibers. The cable, etc., can be designed for low, medium, high or extra-high voltage applications. Typical cable designs are illustrated in U.S. Pat. Nos. 5,246,783, 6,496,629 and 6,714,707.

"Facial surface", "planar surface", "top surface", "bottom surface" and the like are used in distinction to "edge surface". If rectangular in shape or configuration, an article, e.g., a sheet or film, will comprise two opposing facial surfaces joined by four edge surfaces (two opposing pairs of edge surfaces, each pair intersecting the other pair at right angles). If circular in configuration, then the article will comprise two opposing facial surfaces joined by one continuous edge surface. In the context of a cable, the layers are cylindrical in shape and as such, the inner and outer, or first and second, facial surfaces are curved.

"Layer" means a single thickness, coating or stratum spread out or covering a surface.

"Multi-layer" means two or more layers with adjacent layers in contact with each other.

Conductor

The conductor is the core of the cable. It is the component of the cable about which the first semiconductor layer is in wrapped and in contact, and it can comprise a single, electrically conducting wire or a bundle of electrically conducting wires. These wires are typically metal, preferably copper or aluminum. In power transmission aluminum conductor/steel reinforcement (ACSR) cable, aluminum conductor/aluminum reinforcement (ACAR) cable, or aluminum cable is typical. If the conductor comprises a bundle of wires, the individual wires can be bound together with any suitable binding or potting material, e.g., an epoxy resin.

In one embodiment the conductor comprises an optical fiber.

Chemical Composition of the Semiconductor and Insulation Layers

The composition of the semiconductor and insulation layers are not critical to the invention and thus can vary widely and be made from virtually any polymer, most typically a crosslinkable, thermoplastic polymer. These polymers are well known in the art and in some embodiments, the semiconductor and insulation layers are made from the same polymer with the layers differing only by the presence or absence of conducting filler, e.g., conductive carbon black, metal particulate, and the like. The polymers can be crosslinked in any convenient manner, but are typically peroxide and/or moisture cured.

Nonlimiting examples of suitable polymers include styrenic block copolymers (e.g., SEBS), ethylene-based elastomers/plastomers (e.g., ENGAGE™ and AFFINITY ethylene-based copolymers), ethylene block copolymers (OBCs) (e.g., INFUSE™ 9507 or 9100 OBC) and propylene-based plastomers and elastomers (e.g. VERSIFY™ 3300 and 4200). Other TPE polymers useful in the practice of this invention include, for example, but are not limited to, thermoplastic urethane (TPU), ethylene/vinyl acetate (EVA) copolymers (e.g., ELVAX 40L-03 (40% VA, 3MI) (DuPont)), ethylene/ethyl acrylate (EEA) copolymers (e.g., AMPLIFY) and ethylene acrylic acid (EAA) copolymers (e.g., PRIMACOR) (The Dow Chemical Company), polyvinylchloride (PVC), epoxy resins, styrene acrylonitrile (SAN) rubber, and Noryl® modified PPE resin (amorphous blend of polyphenylene oxide (PPO) and polystyrene (PS) by SABIC), among others. Also useful are olefinic elastomers including, for example, very low density polyethylene (VLDPE) (e.g., FLEXOMER® ethylene/1-hexene polyethylene, The Dow Chemical Company), homogeneously branched, linear ethylene/a-olefin copolymers (e.g. TAFMER® by Mitsui Petrochemicals Company Limited and EXACT® by DEXPlastomers), and homogeneously branched, substantially linear ethylene/a-olefin polymers (e.g., AFFINITY® ethylene-octene plastomers (e.g., EG8200 (PE)) and ENGAGE® polyolefin elastomers, The Dow Chemical Company). Substantially linear ethylene copolymers are more fully described in U.S. Pat. Nos. 5,272,236, 5,278,272 and 5,986,028.

Additional olefinic interpolymers useful in the present invention include heterogeneously branched ethylene-based interpolymers including, but are not limited to, linear medium density polyethylene (LMDPE), linear low density polyethylene (LLDPE), and ultra low density polyethylene (ULDPE). Commercial polymers include DOWLEX™ polymers, ATTANE™ polymer, FLEXOMER™, HPDE 3364 and HPDE 8007 polymers (The Dow Chemical Company), ESCORENE™ and EXCEED™ polymers (Exxon Mobil Chemical). Nonlimiting examples of suitable TPUs include PELLETHANE™ elastomers (Lubrizol Corp. (e.g., TPU 2103-90A); ESTANE™, TECOFLEX™, CARBOTHANE™, TECOPHILIC™, TECOPLAST™ and TECOTHANE™ (Noveon); ELASTOLLAN™, etc. (BASF), and commercial TPUs available from Bayer, Huntsman, the Lubrizol Corporation and Merquinsa.

The layers may and usually do contain one or more additives including but not limited to processing aids, fillers, crosslinking agents, crosslinking co-agents, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives, other than fillers, are typically used in amounts ranging from 0.01 or less to 10 or more wt % based on the weight of the composition. Fillers are generally added in larger amounts although they the amount can range from as low as 0.01 or less to 50 or more wt % based on the weight of the composition. Examples of fillers include but are not limited to clays, precipitated silica and silicates, fumed silica, calcium carbonate, ground minerals, and carbon blacks with typical arithmetic mean particle sizes larger than 15 nanometers. Conductive additives and fillers, e.g., those that yield a conductivity of less than 1,000 ohms per meter (ohm-m) in a filled composition, are typically used in the semiconductive layers, and nonconductive or poorly conductive additives and fillers, e.g., those that yield an insulation volume resistivity of no less than $10^8$ ohm-m, are typically used in the insulation layers.

Compounding and Fabrication

Compounding of cable layer material can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder.

A cable containing semiconductor and insulation layers can be prepared with various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating where a layer is crosslinked after extrusion, the cable often passes immediately into a heated vulcanization zone downstream of the extrusion die. The heated cure zone can be maintained at a temperature in the range of about 200° C. to about 350° C., preferably in the range of about 170° C. to about 250° C. The heated zone can be heated by pressurized steam, or inductively heated pressurized nitrogen gas.

Method of Manufacture

Figure 2:
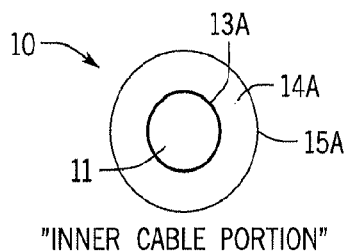
FIG. 2 is a schematic illustration of one embodiment of an inner power cable of this invention.

FIG. 1 describes one embodiment of the manufacture of inner power cable 10 (FIG. 2). Conductor 11 is fed to triple extrusion die 12 in which the first semiconductor layer, first insulation layer and second semiconductor layer are applied in concentric fashion to it. Triple extrusion is a known process, and in it each layer is applied simultaneously, or near simultaneously, such that the first semiconductive layer is applied over and in contact with the conductor, the first insulation layer is applied over and in contact with the first semiconductive layer, and the second semiconductive layer is applied over and in contact with the first insulation layer. The first semiconductive layer is fed to die 12 from extruder 13, the first insulation layer is fed to die 12 from extruder 14, and the second semiconductive layer is fed to die 12 from extruder 15.

Inner power cable 10 is passed through continuous vulcanization (CV) tube 16 in which the various layers are crosslinked (partially or fully depending upon the composition of the individual layer), through cooling station 17, and eventually to take-up reel 18. Depending upon the conductor, chemical composition of the various layers and the physical construction of the cable (e.g., layer thicknesses), in some embodiments this inner power cable can serve as a low or medium voltage cable. As seen in FIG. 2, inner power cable 10 comprises conductor 11 (here shown as a bundle of wires), first semiconductor layer 13A, first insulation layer 14A and second semiconductor layer 15A. The layers are arranged about conductor 11 in concentric circles.

In another embodiment inner power cable is made by first extruding the first semiconductor layer over the conductor, then extruding the first insulation layer over the first semiconductor layer, and then extruding the second semiconductor layer over the first semiconductor layer. In some embodiments each layer is at least partially cured before the next layer is applied. In one embodiment the first semiconductive and first insulation layers are applied simultaneously or near simultaneously before the second semiconductor layer is applied. In one embodiment the first insulation and second semiconductor layers are applied simultaneously or near simultaneously over the first semiconductor layer. Triple extrusion is the preferred process of applying the three layers to the conductor.

Figure 3:
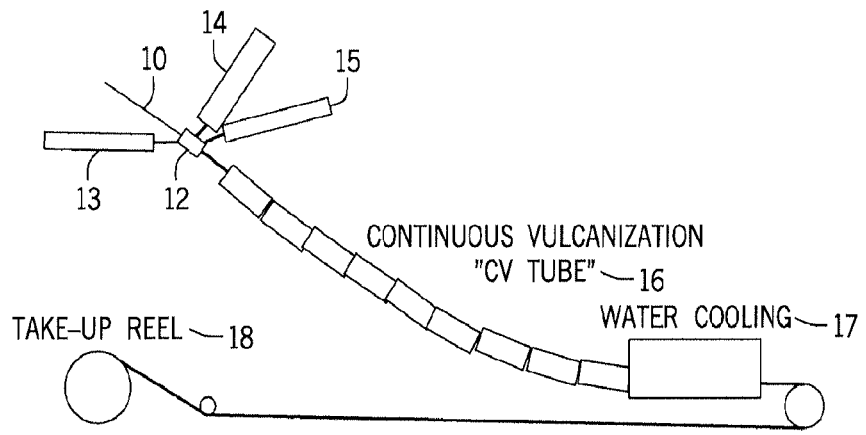
FIG. 3 is a schematic illustration of one embodiment of extruding the third and fourth semiconductor and second insulation layers over an inner power cable.
Figure 5:
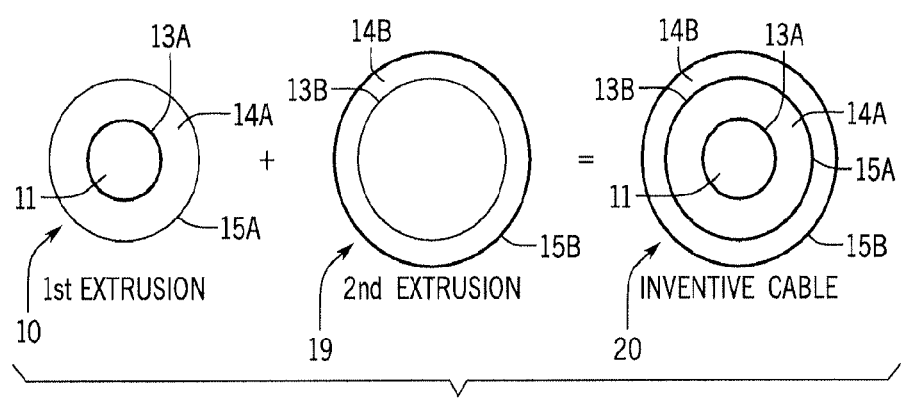
FIG. 5 is a schematic illustration of the component parts of a power cable of this invention in an exploded format.

The third and fourth semiconductor layers and the second insulation layer are then applied to the inner power cable in the same manner as their counterparts were applied to the conductor. Indeed, as shown in FIG. 3 the same equipment that was used to construct inner power cable 10 can be used to complete the construction of power cable 20 (FIG. 5). In this instance, inner power cable 10 replaces conductor 11, and extruder 13 feeds die 12 with the composition that becomes third semiconductor layer 13B, extruder 14 feeds die 12 with the composition that becomes second insulation 14B, and extruder 15 feeds die 12 with the composition that becomes fourth semiconductor 15B. Alternatively, the compositions that become layers 13B, 14B and 15B can be applied individually or in combination with the composition that becomes an adjacent layer as described above.

Figure 4:
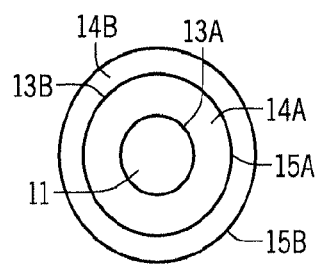
FIG. 4 is a schematic illustration of one embodiment of a power cable of this invention.

FIGS. 4 and 5 show schematically the construction of power cable 20. The first extrusion pass constructs inner power cable 10, and the second extrusion pass applies second extrusion coatings 19. The combination of these two constructions is power cable 20.

The method of this invention allows for the construction of power cables with thick insulation, i.e., a total thickness of 9 millimeters (mm) or more. "Total thickness" means the sum of the thicknesses of each insulation layer in the cable. The thickness of each insulation layer can be the same or different.

Power cables with a single thick insulation layer are difficult to manufacture for one or more of the following reasons: (i) they require a sufficiently long vulcanization process to ensure adequate crosslinking of the inner layers of the insulation, (ii) the cable requires sufficient cooling to enable reeling, (iii) controlled cooling is required to minimize longitudinal stresses that can lead to shrink-back of the insulating layers from the conductor, (iv) difficulty in cable centering in some manufacturing configurations in which heavy-wall cable designs are subjected to gravitational forces that lead to sag of the molten insulation around the conductor, (v) long degassing times required to remove crosslinking byproducts via diffusion through the thick layer of insulation, and (vi) limited availability of cable lines suitable for high-voltage cable manufacturing. To avoid some of these problems, the insulation layer can be applied in multiple passes but this can lead to the entrapment of contaminants between the insulation layers.

The process of this invention can produce a power cable with a total insulation thickness suitable for high voltage applications and avoid some or all of these difficulties. This new process and cable design employ multiple production passes through a co-extrusion and cross-linking production line in which instantaneous line rate can be dramatically increased due to the reduced limitations from curing and cooling. Shrink-back and sag is significantly reduced as the inner power cable on the second pass has already been cooled. Additionally, this multi-step process may be suitable for high-voltage cable production using equipment that is currently utilized for medium-voltage cables.

This new cable design also employs a semiconductor or field grading layer between two insulating layers. This intermediate semiconductive/field grading layer assists in the cable meeting stringent performance measures by encapsulating any contamination which may have been introduced on the surface of the second semiconductor layer during the production of the of the inner power cable. Moreover, this new process and cable design may increase manufacturing process latitude and free up capacity on large continuous vulcanization (CV) lines through line speed increases (a smaller core can be made on medium voltage CV lines). These benefits should also extend into extra-high voltage cable manufacture.

Another potential benefit of this invention is the ability to utilize different insulation types in the inner and outer insulation layers. Not only can this mean very high quality (cleanest and most costly) materials only for the inner (highest stress) layer with less costly materials in the outer layer, but it would also provide opportunities to introduce more flexible or filled insulation layers in the outer layer as a means to increase cable flexibility. Of course, although the invention has been described in terms of two insulation layers separated by a semiconductor layer, the process can be repeated to produce a power cable with three or more insulation layers, each layer separated by a semiconductor layer. Also, although the invention has been described in terms of a power cable, it can be used to manufacture other cable as well, e.g., low and medium voltage cables, fiber optic cables, etc.

The relative thicknesses of the semiconductor and insulation layers of the cables of this invention can vary to convenience, but typically each semiconductor layer is narrower or of less thickness than each insulation layer. Each semiconductor layer is typically, but not necessarily, of like thickness, e.g., from 0.2 to 1.5 mm, more typically from 0.4 to 1 mm, although the second and third semiconductor layers can be considered to form effectively, if not physically (an interface can exist between the two layers), a merged layer with a combined thickness of the two individual layers, e.g., from 0.4 to 3 mm. Of course, the second and third semiconductor layers can be applied at half or less the thickness of the first and fourth semiconductor layers to form a combined intermediate layer of approximately the same or less thickness as that of the first and fourth semiconductor layers with the combined thickness of the second and third semiconductive layers typically from 0.4 to 1.5 mm, or 0.4 to 1 mm. If of a greater thickness than the first and fourth semiconductor layers, the combined second and third semiconductor layers will have a high conductivity and/or permittivity relative to these other two semiconductor layers. Each insulation layer is also typically, but not necessarily, of the same thickness as the other insulation layer(s).

Another advantage of the process of this invention is that the inner power cable can either be immediately processed to a high voltage cable, i.e., passed through the triple extrusion line again, or it can be inventoried, e.g., for one or more days, for later processing, either on the same or different line or, for that matter, at a different location altogether.

In one embodiment the insulation layer is free-radical (e.g., peroxide) cured and thus subjected to continuous vulcanization as described in FIGS. 1 and 3 to thermally activate the crosslinking agent. In one embodiment the insulation is moisture-cured, and the continuous vulcanization tube described in FIGS. 1 and 3 is replaced with a sauna or similar treatment (not shown) to promote water diffusion into the insulation layer, or simply allowed to cure under ambient conditions. For moisture-cure compositions, one or more of the composition components typically contains silane or similar functionality.

Although the invention has been described with certain detail, this detail is for the primary purpose of illustration. Many variations and modifications can be made by one skilled in the art without departing from the spirit and scope of the invention as described in the following claims.

I claim:

1. A method of manufacturing a power cable comprising a conductor, semiconductor layers and insulation layers, the process comprising the steps of:
    (A) Extruding about the conductor a first insulation layer positioned between first and second semiconductor layers to make an inner power cable comprising:
      (1) The conductor which is in contact with,
      (2) A first semiconductor layer which is also in contact with,
      (3) A first insulation layer which is also in contact with,
      (4) A second semiconductor layer, and (B) Extruding about the inner power cable a second insulation layer positioned between third and fourth semiconductor layers to make the power cable with a total insulation thickness of greater than or equal to 9 mm, the power cable comprising the inner power cable of which the second semiconductor layer is in contact with:

(5) The third semiconductor layer which is also in contact with, (6) The second insulation layer which is also in contact with, (7) The fourth semiconductor layer.

2. The method of claim 1 in which the first insulation layer of the inner power cable is subjected to free radical promoted crosslinking prior to the extrusion of the second insulation layer about the inner power cable.

3. The method of claim 1 in which the first insulation layer of the inner power cable is subjected to moisture-promoted crosslinking prior to the extrusion of the second insulation layer about the inner power cable.

4. The method of claim 1 in which one or more days elapse between the manufacture of the inner power cable and the extrusion of the second insulation layer about the inner power cable.

\* \* \* \* \*